United States Patent [19]
Tontini et al.

[11] 3,711,013
[45] Jan. 16, 1973

[54] THRUST CONTROL AND SOUND APPARATUS

[75] Inventors: Remo Tontini; Victor Millman; Howard R. MacDonald, all of San Diego, Calif.

[73] Assignee: Rohr, Corporation, Chula Vista, Calif.

[22] Filed: April 26, 1971

[21] Appl. No.: 137,630

Related U.S. Application Data

[63] Continuation of Ser. No. 866,641, Oct. 15, 1969, abandoned.

[52] U.S. Cl............................239/265.17, 239/265.39
[51] Int. Cl.............................B63h 25/46, B64c 15/10
[58] Field of Search....239/138, 338, 265.17, 265.23, 239/265.39, 265.13

[56] References Cited

UNITED STATES PATENTS

| | | | |
|---|---|---|---|
| 3,370,794 | 2/1968 | Drewry et al. | 239/265.17 |
| 3,426,972 | 2/1969 | Osburn | 239/265.17 |
| 2,487,588 | 11/1949 | Price | 239/265.19 |
| 2,831,321 | 4/1958 | Laucher | 239/265.39 |
| 2,949,734 | 8/1960 | Bertin et al. | 239/265.17 |
| 3,463,402 | 8/1969 | Langston, Jr. | 239/265.13 |
| 3,502,288 | 3/1970 | Paulin et al. | 239/265.17 |

*Primary Examiner*—Lloyd L. King
*Attorney*—George E. Pearson

[57] ABSTRACT

Jet engine is provided with ejector ring aft of nozzle exit defining mixing zone for engine exhaust and free steam air. Ring is hollow to form plenum chamber open at rear to act as peripheral nozzle to eject peripheral jet stream surrounding mixed gases, adding to total thrust and further mixing gases. Plenum chamber is supplied with gases from engines through conduits which also support ring on engine. Peripheral series of flaps pivotally mounted at their leading edges to trailing edge of plenum chamber closely surround jet stream and attach to it by Coanda effect. Flaps swing toward and away from axis to vary cone angle of ring and of peripheral jet stream and thus attain proper diffusion angle for optimum thrust under varying flight conditions of power and speed.

13 Claims, 3 Drawing Figures

PATENTED JAN 16 1973

3,711,013

INVENTOR.
REMO TONTINI
VICTOR MILLMAN
HOWARD R. MACDONALD
BY Edwin D. Grant
ATTORNEY

THRUST CONTROL AND SOUND APPARATUS

CROSS REFERENCE TO RELATED APPLICATIONS

This application is a continuation of application Ser. No. 866,641, filed Oct. 15, 1969, now abandoned.

BACKGROUND OF THE INVENTION

This invention lies in the field of gas turbine or jet engines which produce reaction thrust by the high velocity rearward discharge of exhaust gases from the turbines. In order to obtain the maximum thrust from a simple engine a great deal of study and calculation goes into the design of the exhaust nozzle, and for best results it must be tailored to the particular installation, taking into account the weight, speed, and other operating characteristics of the airplane on which it is mounted.

One way of increasing the thrust of such engine is to design it so that the compressor delivers more air than the turbine uses, the excess flowing around the outside of the turbine and joining the turbine exhaust. The mixing of the two gases adds mass to the thrust-producing stream and reduces the velocity and temperature thereof, which also reduces the noise level.

Another system which is used extensively includes the provision of an ejector ring which is larger than the exhaust nozzle outlet and is located aft of the outlet although it may overlap the nozzle to some extent. Free stream air enters the annular flow path defined by the ring and mixes with the exhaust gas, and also with the fan air if the engine is of the fan type. All of the gases mix within the ring with the same general effects mentioned above.

To attain optimum thrust under varying flight conditions of power and speed, the nozzle is often designed with means to vary the throat area or the discharge cone or both, and many problems arise because of the various moving parts which must operate reliably while being subjected to the flow of the very hot exhaust gas.

SUMMARY OF THE INVENTION

The present invention is directed particularly to the type of aircraft jet engine assembly which incorporates an ejector ring with or without the addition of the fan air feature. It improves the ejector action and makes it possible to use a shorter and lighter ejector ring. In addition, it increases the total thrust and decreases the noise, and also performs the function of the variable nozzle with simplicity and reliability.

Generally stated, the total apparatus includes an engine having a conventional nozzle and provided with the fan air feature if desired. An ejector ring is located aft of the nozzle and preferably with its leading edge adjacent to or slightly aft of the exit margin of the nozzle. The ring is hollow to serve as a plenum chamber having a series of slots or one continuous peripheral slot at its trailing edge to direct high-pressure gas rearwardly and form an auxiliary peripheral jet stream. The ring is supported on the engine by a plurality of fore and aft extending conduits or tubes attached at their forward ends to the engine and at their aft ends to the ring. The forward ends are open to receive the turbine exhaust gas which may include fan air mixed with it, and the gas passes through the conduits to the plenum chamber to form the supply for the peripheral nozzle means.

In the absence of any modulating means the auxiliary jet stream would issue rearwardly substantially as a cylinder. However, modulating means are provided in the form of a series of peripherally arranged flaps pivoted at their forward ends to the trailing edge of the plenum chamber and located immediately around the peripheral jet stream, causing a Coanda-type attachment. The flaps can be actuated in flight by a suitable servomotor to swing toward or away from the axis of the ring and cause the peripheral jet stream to define a convergent or divergent cone. The jet stream thus acts as a virtual rearward extension of the ring, making it effectively much longer and varying its contour to provide optimum thrust. Thus, the ring may be much shorter and lighter than would otherwise be possible.

The high velocity peripheral jet stream, in addition to directly providing additional thrust, acts through its contact with the gas mixture to cause further intimate mixing and reduction of noise level. Since the ring is in contact with free stream air and with the mixed gases with are cooler than the direct turbine exhaust, its moving parts operate at a lower temperature and reliability is greatly increased.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENT

Figure 1:
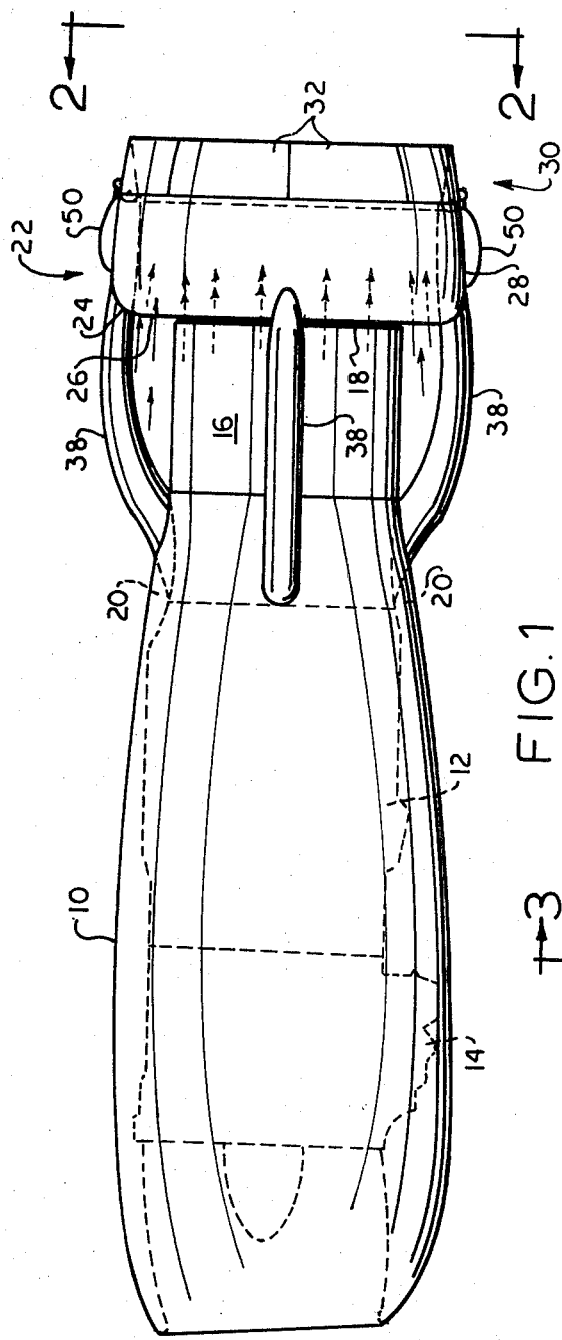
FIG. 1 is a schematic side elevational view of an engine installation incorporating the apparatus of the invention.

The assembly shown schematically in FIG. 1 includes a housing 10 enclosing an engine 12 and a compressor 14 driven by the turbine. A nozzle 16 is attached to the turbine to receive exhaust gas therefrom and discharge it rearwardly from its exit margin 18 which preferably lies in a plane perpendicular to the axis of the compressor, engine, and nozzle. The compressor may be designed to deliver more air than the turbine requires, and the excess flows rearwardly within housing 10 to discharge it at 20 into the nozzle where it mixes with the turbine exhaust gas to add mass, cool the mixture, and lower the noise level.

An ejector ring 22, which is preferably annular, is mounted coaxially aft of the nozzle with its leading edge 24 preferably in about the same plane as the exit margin 18 of the nozzle. The ring is substantially larger than the nozzle to provide an annular inlet flow passage 26 for free stream air to enter and mix with the gases issuing from the nozzle. The intermediate section 28 of the ring defines the mixing zone where the free stream air meets the other gases, and the contour of the ring is completed by a trailing section 30 comprising a plurality of peripherally arranged flaps 32 pivoted at their forward ends by pivot means 34 to the aft or trailing edge of the intermediate section.

Figure 3:
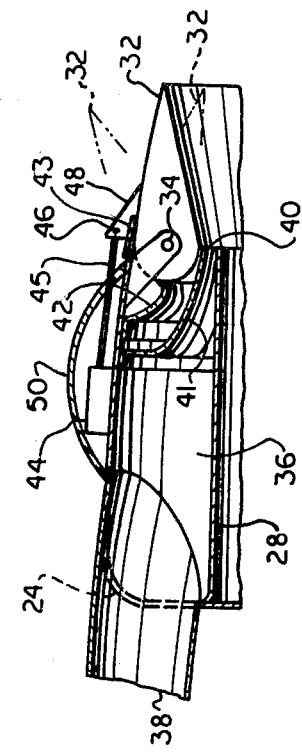
FIG. 3 is an enlarged schematic detail view in section of the ejector ring.
Figure 2:
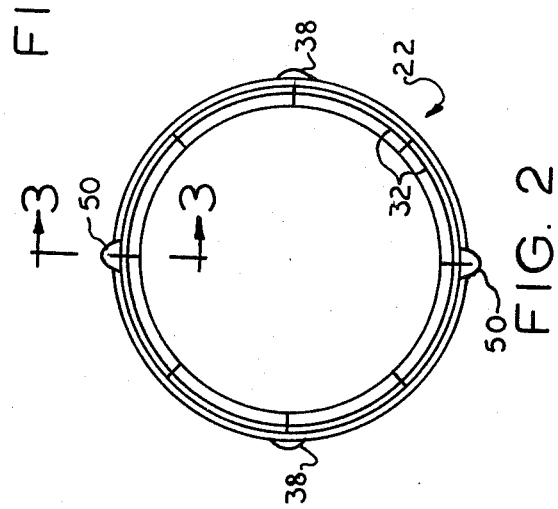
FIG. 2 is an end elevational view of the apparatus of FIG. 1.

The intermediate section 28 of the ring is hollow to form an annular plenum chamber 36 as shown in FIG. 3, and the ring is mounted to the engine by a plurality of peripherally spaced conduits or tubes 38 which, as shown in FIG. 1, connect at their forward ends with the nozzle adjacent to the turbine and at their aft ends with the forward portion of the ring. The conduits receive exhaust gas or a mixture of exhaust gas and fan air from the engine and deliver it at high pressure to the plenum chamber.

Returning to FIG. 3, it will be seen that the plenum chamber is open at its trailing edge to form a plurality of peripherally arranged slots or a single peripheral slot 40 which discharges gas from the plenum chamber rearwardly in a substantially cylindrical auxiliary peripheral jet stream which surrounds the gas mixture issuing from the mixing zone and acts as a virtual rearward continuation of the ejector ring. Thus it surrounds and controls the mixture and causes further intimate mixing to further reduce the noise level.

More particularly, the aft end of ring 22 is formed with a wall 41 which extends radially inwardly from the outer wall of said ring and then curves in the downstream direction, the forward ends of flaps 32 being disposed between the aft ends of said wall 41 and said outer wall. A flexible wall 42 is attached to the inner surface of the outer wall of the ring and to the forward ends of the flaps, and a flexible sheet 43 is attached to the aft edge of said outer wall and extends over the forward portions of said flaps. Thus free stream air is prevented from reaching the points on the flaps where exhaust gas, or a mixture of exhaust gas and fan air, flows from slot 40. Since the inner surfaces of the flaps are substantially in alignment with the slot, the peripheral jet stream flowing from the latter attaches to said flaps by virtue of the Coanda effect. Because of this attachment, the peripheral jet stream will follow the adjacent walls of the flaps and as they are swung toward or away from the axis of the ring, the jet stream will form a rearwardly convergent or divergent cone. Since the jet stream acts as a continuation of the ring it effectively changes the contour of the ring to provide any desired throat configuration.

The flaps may be adjusted to any desired angle in flight by means of one or more servomotors 44 which act through links 45 pivotally connected at 46 to control horns 48. A streamlined cover 50 is provided for each servomotor. All of the flaps are mounted in overlapping relation so that there is no peripheral gap at any angle of adjustment. The overlapping relation also insures that they will all move in unison.

It will be apparent that the invention provides an apparatus which increases the thrust of a jet engine by providing an ejector ring and further by producing a rearwardly directed auxiliary peripheral jet stream, which additionally increases the effective length of the ring, causes mixing to further reduce the sound level, and modulates the effective contour of the ring to obtain optimum thrust in varying flight conditions of power and speed.

What is claimed as new and useful and desired to be secured by U.S. Letters Patent is:

1. Apparatus for controlling the thrust and suppressing the sound of a jet engine having a rearwardly discharging exhaust nozzle, comprising: an ejector ring having a leading edge, an intermediate section, and a trailing section; said ejector ring being located aft of the exhaust nozzle with its leading edge adjacent to the nozzle exit and being substantially larger than the nozzle to define a peripheral inlet path for the flow of free stream air; the intermediate section of the ejector ring defining a mixing zone for the free stream air and the gas stream issuing from the nozzle; auxiliary, rearwardly discharging jet nozzle means extending around the periphery of the trailing edge of said intermediate section; and means to supply gas under pressure to said nozzle means.

2. Apparatus as claimed in claim 1; the means to supply gas under pressure including conduit means carrying a mixture of engine fan air and turbine exhaust gas.

3. Apparatus as claimed in claim 1; the means to supply gas under pressure comprising a plenum chamber within the ejector ring flow connected to the nozzle means; and conduit means to conduct gas under pressure from the engine to the plenum chamber.

4. Apparatus as claimed in claim 3; said conduit means comprising a plurality of peripherally spaced rearwardly extending tubes connected at their forward ends to the nozzle and at their aft ends to the ejector ring to support the ring on the engine.

5. Apparatus as claimed in claim 1; said nozzle means constituting the trailing edge of the plenum chamber and being open rearwardly substantially throughout the periphery of the trailing edge.

6. Apparatus as claimed in claim 1; the trailing section of said ejector ring comprising a series of flaps extending completely around the periphery of the auxiliary jet nozzle means; the inner surfaces of said flaps being in alignment with the outer walls of said nozzle means to cause Coanda-type attachment of the peripheral jet stream from said nozzle means; said flaps being angularly movable in unison toward and away from the axis of the engine to vary the diffusion angle of the ejector ring.

7. Apparatus as claimed in claim 6; and at least one servo motor connected to said flaps to actuate them to move to selected angles in flight in order to produce the proper diffusion angle for each flight condition of power and speed.

8. Apparatus as claimed in claim 1; said nozzle having an exit margin lying substantially in a plane normal to the axis of the engine and nozzle, and the leading edge of the ejector ring lying substantially in the same plane; the intermediate section of the ejector ring being hollow to define an annular plenum chamber and being open around its trailing edge to define said auxiliary, rearwardly discharging nozzle means; a plurality of peripherally spaced conduits extending rearwardly from the engine to the ejector ring to support the ring on the engine and to supply gas under pressure from the engine to the plenum chamber; and a series of peripherally arranged flaps secured to the intermediate section and constituting the trailing section of the ejector ring; said flaps being so located with respect to the auxiliary nozzle means as to cause Coanda-type attachment of the peripheral jet stream issuing from the auxiliary nozzle means; said flaps being pivotally connected at their leading edges to the intermediate section and angularly movable in unison to vary the diffusion angle of the ejector ring and of the peripheral jet stream.

9. A method of controlling the thrust and suppressing the sound of a jet engine having a rearwardly discharging exhaust nozzle, comprising: providing a mixing zone aft of nozzle; introducing gas from the engine and free stream air into the mixing zone; mixing said gases in said zone; producing a high velocity peripheral rearwardly directed jet stream aft of the mixing zone to define a second mixing zone; causing a portion of the peripheral jet stream to mix with the previously mixed gases; and varying the angle of flow of all portions of the jet stream toward or away from the axis of the jet stream in unison to produce the optimum diffusion angle.

10. Apparatus for controlling the thrust and suppressing the sound of a jet engine having a rearwardly discharging exhaust nozzle, comprising: an ejector ring having a leading edge, an intermediate section, and a trailing section; said ejector ring being located aft of the exhaust nozzle with its leading edge adjacent to the nozzle exit and being substantially larger than the nozzle to define a peripheral inlet path for the flow of free stream air; the intermediate section of the ejector ring defining a mixing zone for the free stream air and the gas stream issuing from the nozzle; auxiliary, rearwardly discharging jet nozzle means extending around the periphery of the trailing edge of said intermediate section; means to supply gas under pressure to said nozzle means; and means for varying the angle of discharge from said nozzle means to produce a virtual extension of the ejector ring having a variable diffusion angle.

11. A method of controlling the thrust and suppressing the sound of a jet engine having a rearwardly discharging exhaust nozzle, comprising: providing a mixing zone aft of nozzle; introducing gas from the engine and free stream air into the mixing zone; mixing said gases in said zone; producing a high velocity peripheral rearwardly directed jet stream aft of the mixing zone to define a second mixing zone; and causing a portion of the peripheral jet stream to mix with the previously mixed gases.

12. The method of suppressing the jet noise and augmenting the thrust of an aircraft jet engine during takeoff and climb of the aircraft while also optimizing thrust during cruise which comprises the steps of providing the engine with an integrated ejector nozzle, and introducing through the inner wall of the ejector nozzle a peripheral flow of energized gases upstream of the exit plane of the ejector nozzle so that the energized flow surrounds and accompanies the jet stream issuing from said exit plane.

13. An ejector nozzle for a jet propelled engine which suppresses jet noise and augments thrust during takeoff and climb while optimizing thrust during cruise comprising an integrated ejector barrel, said ejector barrel having means for introducing peripheral flow of energized gases thereinto through the internal wall of the ejector barrel to surround and accompany the jet stream issuing from the exit plane of the ejector barrel, said engine having a rearwardly discharging exhaust nozzle and said integrated ejector barrel comprising an ejector ring located aft of the exhaust nozzle to define an inlet path for the flow of free stream air into the ejector ring and said means for introducing said peripheral flow of energized gases thereinto comprises means for supporting the ejector ring on the engine.

* * * * *